US010085391B2

(12) United States Patent
Haub et al.

(10) Patent No.: US 10,085,391 B2
(45) Date of Patent: Oct. 2, 2018

(54) IRRIGATION MAT FOR SUPPLYING FLUIDS TO THE ROOT REGION OF PLANTS AND IRRIGATION SYSTEM

(71) Applicant: EMP Enterprises, Inc., Henderson, NV (US)

(72) Inventors: Christine Haub, Bad Camberg (DE); Dietmar Haub, Bad Camberg (DE); Nico Stienemann, Gronau (DE)

(73) Assignee: EMP Enterprises, Inc., Henderson, NV (US)

( * ) Notice: Subject to any disclaimer, the term of this patent is extended or adjusted under 35 U.S.C. 154(b) by 192 days.

(21) Appl. No.: 14/866,137

(22) Filed: Sep. 25, 2015

(65) Prior Publication Data

US 2016/0088806 A1   Mar. 31, 2016

(30) Foreign Application Priority Data

Sep. 25, 2014 (DE) .................. 10 2014 219 449

(51) Int. Cl.
*A01G 25/06* (2006.01)
*A01G 13/02* (2006.01)

(52) U.S. Cl.
CPC ......... *A01G 25/06* (2013.01); *A01G 13/0268* (2013.01)

(58) Field of Classification Search
CPC .. A01G 25/00; A01G 25/06; A01G 2025/003; A01G 2025/006; A01G 13/0268; A01G 25/02
See application file for complete search history.

(56) References Cited

U.S. PATENT DOCUMENTS

| 1,989,427 A | 1/1935 | Robey |
| 2,052,020 A | 8/1936 | Black |
| 2,566,833 A | 9/1951 | Healy |
| 2,653,449 A | 9/1953 | Stauch |
| 3,205,619 A * | 9/1965 | Henry ............... A01G 13/0268 239/566 |
| 3,361,359 A | 1/1968 | Chapin |
| 3,521,821 A | 7/1970 | Emsbach |
| 3,929,258 A | 12/1975 | Stephens |
| 3,966,233 A | 6/1976 | Diggs |
| 3,996,968 A | 12/1976 | Bergman et al. |
| 4,139,159 A | 2/1979 | Inoue et al. |

(Continued)

FOREIGN PATENT DOCUMENTS

| BE | 1011763 | 12/1999 |
| CA | 2498070 A1 * | 8/2006 ............. A01G 25/02 |

(Continued)

OTHER PUBLICATIONS

WO 02082888, English Translation.*

(Continued)

*Primary Examiner* — Magdalena Topolski
(74) *Attorney, Agent, or Firm* — Weide and Miller, Ltd.

(57) ABSTRACT

An irrigation mat for supplying fluids for a root region of plants which has at least one lower layer and one upper layer that are each composed of a textile fabric. Between the lower layer and the upper layer, at least one tunnel is provided for accommodating at least one tube, which has exit openings for the fluid. The lower layer and the upper layer are attached to each other over a large area in at least one region outside the tunnels.

19 Claims, 5 Drawing Sheets

(56) References Cited

U.S. PATENT DOCUMENTS

| | | | |
|---|---|---|---|
| 4,833,822 A * | 5/1989 | DiGrassi | A01G 13/0268 47/2 |
| 5,117,580 A * | 6/1992 | Brown | A01G 13/0268 126/626 |
| 5,374,138 A | 12/1994 | Byles | |
| 5,752,784 A | 5/1998 | Motz et al. | |
| 5,839,659 A | 11/1998 | Murray | |
| 5,938,372 A | 8/1999 | Lichfield | |
| 6,571,833 B1 | 6/2003 | McLarty et al. | |
| 8,129,019 B2 | 3/2012 | Pourdeyhimi et al. | |
| 9,650,271 B2 | 5/2017 | Potts | |
| 2003/0017001 A1 | 1/2003 | Ogi | |
| 2004/0133176 A1 * | 7/2004 | Muthiah | A01G 13/0268 604/368 |
| 2006/0105612 A1 | 5/2006 | Moncavage | |
| 2006/0185241 A1 * | 8/2006 | Theoret | A01G 25/02 47/79 |
| 2006/0201061 A1 * | 9/2006 | Caron | A01G 25/06 47/79 |
| 2007/0194149 A1 * | 8/2007 | Mavrakis | A01G 25/023 239/542 |
| 2008/0072480 A1 * | 3/2008 | McGrady | A01G 13/0268 47/21.1 |
| 2008/0210785 A1 | 9/2008 | Hou et al. | |
| 2008/0282609 A1 * | 11/2008 | Nelson | A01G 13/0268 47/48.5 |
| 2010/0282859 A1 | 11/2010 | Helbig et al. | |
| 2010/0319251 A1 * | 12/2010 | Su | A01G 25/06 47/79 |
| 2011/0030275 A1 | 2/2011 | Brown | |
| 2011/0110720 A1 | 5/2011 | Huang | |
| 2011/0258927 A1 * | 10/2011 | Carter | A01G 13/0268 47/66.7 |
| 2011/0299928 A1 * | 12/2011 | Alba Flores | A01G 25/00 405/36 |
| 2012/0279120 A1 | 8/2012 | Prescott | |
| 2013/0075490 A1 * | 3/2013 | Roess | A01G 25/06 239/145 |
| 2013/0117877 A1 * | 5/2013 | Akpo | A01H 1/04 800/260 |
| 2016/0088806 A1 | 3/2016 | Haub | |
| 2016/0198655 A1 * | 7/2016 | Ishii | A01G 7/00 47/59 R |

FOREIGN PATENT DOCUMENTS

| | | | |
|---|---|---|---|
| CA | 2906064 | 3/2016 | |
| DE | 1434120 A1 * | 11/1968 | A01G 13/0268 |
| DE | 2528166 | 2/1976 | |
| DE | 4037396 | 5/1991 | |
| DE | 69514365 | 7/2000 | |
| DE | 102011083742 | 3/2013 | |
| EP | 2248414 | 11/2010 | |
| FR | 2331953 A2 * | 6/1977 | A01G 25/06 |
| FR | 2514046 | 4/1983 | |
| FR | 2981538 A1 * | 4/2013 | E04D 11/002 |
| GB | 1018850 | 2/1966 | |
| WO | WO 0219802 A1 * | 3/2002 | A01G 25/00 |
| WO | 02/082888 | 10/2002 | |
| WO | 2013107954 | 7/2013 | |

OTHER PUBLICATIONS

CIPO Examination Search Report, dated Feb. 21, 2017 for Application No. 2,906,064, 3 pages.

International Search Report, dated Mar. 31, 2016, for Application PCT/EP2015/071874.

Written Opinion, dated Mar. 31, 2016, for Application PCT/EP2015/071874.

Mohamed Abuarab, Ehab Mostafa, and Mohamed Ibrahim, "Effect of air injection under subsurface drip irrigation on yield and water use efficiency of corn in a sandy clay loam soil," Journal of Advanced Research (2013), Sep. 16, 2012, 7 pages (493-499), 2090-1232 © 2012 Cairo University.

Dec. 26, 2017 International Search Report and Written Opinion in PCT/US2017/054582.

* cited by examiner

IRRIGATION MAT FOR SUPPLYING FLUIDS TO THE ROOT REGION OF PLANTS AND IRRIGATION SYSTEM

CROSS REFERENCE TO RELATED APPLICATION

This application claims priority to German Patent Application DE 10 2014 219 449.0 which was filed on Sep. 25, 2014, the contents of which are hereby incorporated by reference.

BACKGROUND

The disclosed embodiments relate to an irrigation mat for supplying fluids to the root region of plants and to an irrigation system that is equipped with such an irrigation mat.

The term "irrigation" is understood to be the supplying of fluids, in particular water and/or nutrient solutions, to plants. To irrigate plants, water can be applied to the soil and the plants from above. In order to minimize water loss, the water can be applied in the vicinity of the individual plants by spray devices or drip devices. But in this connection, water is lost particularly through evaporation.

This disadvantage can be avoided if irrigation systems are used that are placed underground in the soil beneath the plants. Such irrigation systems include irrigation mats that are equipped with irrigation tubes, which are connected to the water supply system by means of valves and control units.

DE 695 14 365 T2 has disclosed a capillary irrigation system of this kind, which has an irrigation mat that is equipped with a plurality of perforated irrigation tubes. The irrigation mat is composed of an upper layer of a capillary material and a lower layer of a capillary material, between which the irrigation tubes are situated. The terms "above" and "below" relate to the orientation of the irrigation mat when placed in the soil.

To accommodate the tubes, pockets are provided between the two layers of capillary material, formed by folding the upper layer. The preformed pockets are dimensioned so that the irrigation tubes can be slid into the pockets. The two layers are attached to each other, for example by means of gluing sewing, ultrasound, or welding. The attachments here are seam-like connections, which have the disadvantage that for example sewing threads can break and the attachment points can come loose. The placement of such mats is then significantly more complex due to the slippage of the individual layers. Since such mats have edge lengths of 50 m or more, not only does this impede the handling and laying of the mats, but the tubes can also slip laterally and assume positions other than those provided. A uniform distribution of water in the irrigation mat is no longer possible in this case.

A further problem is the penetration of roots into the exit openings of the perforated tubes. The root system penetrates through the layer of the mats from the outside in the vicinity of the pockets and in particular, extends to the water exit openings, which can then become clogged and in the worst case scenario, can completely block the exit of water. This impairs uniform water distribution in the irrigation mats.

SUMMARY

One object of the disclosed embodiments is to create an irrigation mat and an irrigation system in which the irrigation mat is easy to handle and the irrigation system features a large fluid absorption capacity as well as rapid and improved distribution of the fluid.

In one embodiment, the irrigation system is characterized in that in at least one region outside of the tunnels, the upper layer comprised of a textile fabric and the lower layer comprised of a textile fabric are attached to each other over a large area, such as over their entire area.

In some embodiments, at least 20%, in particular at least 50%, of the available areas are attached to each other. An attachment over the entire area is understood to mean that at least 90% of the available areas are attached to each other.

The area available for the attachment over a large area is comprised of the contact surfaces of the upper and lower layers. In the places in which the two layers rest against each other outside the tunnels, the two layers can be attached to each other over a large area.

According to an exemplary embodiment, the two layers are attached to each other by needling. The needling, which is also referred to as felting, facilitates a simple attachment over a large area—particularly with regard to nonwoven webs. Needle devices such as needle boards are used. In the needling, the two layers are pierced jointly. The single or multiple in-and-out plunges of the needles cause the fibers of the adjacent layers to become intertwined so that the dividing line between the upper and lower layers is largely eliminated and the two layers together form a uniform, largely homogeneous textile fabric. The production process by means of needling has the additional advantage that it is less expensive than, for example, sewing the individual layers to produce seam-like connections.

It has surprisingly turned out that this needling process makes positive changes to the fluid absorption and fluid distribution properties of the layers, particularly in the case of nonwoven webs. It has become apparent that layers attached to each other in this way ensure a quicker and more uniform fluid distribution than is the case with textile fabrics that are attached to each other in seam-like fashion.

When the needling process is used, the benefits of capillarity forces may be more efficiently utilized. The needling process changes the material, such as the textile fabric, in at least two ways. The needling reduces the size and amount of the structures of holes filled with air within the polyester fabric. With smaller sized holes, the overall material density is increased. Thus, the fabric has a more organized pattern of holes surrounded by more walls of polyester. Further, the size of variance between such holes is smaller. The capillary forces therefore are increased and the distribution speed of a fluid, such as water, within the fabric is increased.

In comparison to seam-like attachments, the needling over a large area also achieves a significantly more stable attachment between the layers, thus facilitating the processing and placement of irrigation mats, particularly of large-area ones. Since this attachment of layers does not come loose, the irrigation tubes between the layers cannot slip, thus ensuring a uniform fluid distribution in the irrigation mat. In essence, the irrigation mat forms a single matrix as a result of the needling process.

Another advantage of needling over a large area lies in the fact that, for example, the threads of the kind that are used for the seam-like attachment according to the prior art cannot come loose and catch in the cutting tools when the irrigation mats are being cut to size.

In one embodiment, a tunnel for accommodating the irrigation tube is formed by means of a fold in the lower layer and by means of a fold in the upper layer.

This embodiment has the advantage that upper and lower layers of the same size can be used for producing the irrigation mat. This simplifies the production procedure. The irrigation mat has a symmetrical design with regard to the dividing plane between the upper and lower layers so that during placement, it is not necessary to pay attention to which layer must be on top or the bottom, unless, for example, different materials are used for the top and bottom layers. This facilitates handling. This symmetrical design of the irrigation mat also has the advantage that the fluid is more uniformly distributed to the top and bottom layers.

A "textile fabric" is understood to include all textiles that are permeable to fluids, for example wovens, nonwovens, composite materials, geotextiles, geogrids, or films, that have the capacity to distribute the fluid, such as water, particularly through capillary action.

In one exemplary embodiment, the textile fabric is a nonwoven. One layer of a nonwoven material may have a grammage of 100 to 1000 $g/m^2$. In some embodiments, grammage ranges are from 100 to 300 $g/m^2$. A grammage of at least 100 $g/m^2$ is required in order to ensure a stable needling.

In an exemplary embodiment, the textile fabric is composed of at least one layer of a polyester, in particular a polyester nonwoven. In some embodiments, at least the lower layer is composed of a textile fabric made of polyester, in particular a polyester nonwoven. It is also possible for both layers to be produced from these materials, which simplifies the production.

The fluid absorption capacity and the fluid distribution properties can be further improved if at least one layer, such as the lower layer, is composed of a hydrophilic or hydrophilized material. Hydrophilic fabrics have the advantage that they absorb the fluid, in particular water, better and in greater quantities, can store it for longer periods of time, and can also distribute the fluid better in the irrigation mat.

Polyester materials such as the fibers of polyester nonwovens are inherently hydrophilic. In order to further improve the properties with regard to fluid absorption and fluid distribution, this material can also be subjected to an additional hydrophilizing. The materials may be formed from new or recycled materials of comprised of hydrophilic polymers. Other polyesters, polypropylene and hydrophilic natural fibers and materials may be used.

In one exemplary embodiment, the irrigation mat is equipped with an absorbent powder for storing the fluid. The absorbent powder increases the storage capacity of the irrigation mat without requiring an increase in the grammage. The absorbent material swells and has the advantage that it does not release fluid, even under pressure. Only the roots have the ability to retrieve the fluid, in particular the water, from the absorbent powder. The absorbent powder is able to absorb several times its own weight in fluid, in particular water.

In some embodiments, the irrigation mat has a powder composed of mycorrhizal fungi. The mycorrhizal fungi supply the plants with nutrient salts and water and in return receive a part of the assimilates that are produced by the photosynthesis of the plants. This symbiosis strengthens the roots and the plants as a whole.

In an exemplary embodiment, the powder, in particular the absorbent powder and the powder composed of mycorrhizal fungi, is/are accommodated between the upper layer and lower layer. The powder can be strewn onto the lower layer during the production of the irrigation mat. Because the two layers are attached to each other over a large area, in particular by being needled over a large area, the powder can be fixed between the layers.

The powder can also be integrated into at least one layer. The integration of the powder may take place during the production of the textile fabric. When nonwovens are produced, the powder may be added to the raw material for the nonwoven production, which has the advantage that the powder is uniformly distributed in the layer, particularly in the nonwoven. If the nonwoven is produced by a needling process, then the powder may be strewn into the raw material before the needling.

The irrigation mat may be provided with 5 to 40 $g/m^2$ of absorbent powder and/or 10 to 50 $g/m^2$ powder composed of mycorrhizal fungi. In some embodiments, 10 to 30 $g/m^2$ of absorbent powder, or 10 to 20 $g/m^2$ of absorbent powder, are used. With regard to the powder composed of mycorrhizal fungi, some embodiments may use 20 to 40 $g/m^2$, or 20 to 30 $g/m^2$.

The powders may be integrated into the lower layer. If powders of this kind are strewn or integrated into the layers, it is advantageous if the grammage of the involved layer is at least 300 $g/m^2$ to 1000 $g/m^2$.

The irrigation system according to one embodiment includes an irrigation mat and at least one tube equipped with exit openings. This tube or these tubes is/are placed in the tunnels of the irrigation mat.

A "tube" is understood to include not only a rigid pipe, but also a hose-like tube. The term "tube" includes all lines that are suitable for conveying a fluid through the tunnel of an irrigation mat. The tube may convey any number of fluids beneficial for irrigation such a water with or without diluted fertilizers, pesticides, herbicides, or the like; or air including oxygen and nitrogen. Such tubes are also referred to as perforated tubes since as a rule, they have a multitude of exit openings that are usually spaced definite distances apart from one another in the tube.

According to one embodiment, the tube can have a drip emitter in the vicinity of at least one exit opening. Such drip emitters make it possible to selectively control the output quantity of the fluid and are used in irrigation tubes that are placed directly in the soil. Such tubes with drip emitters are known, for example, from EP 2 248 414 A1. It has turned out that with tubes that have a drip emitter, the fluid can be distributed more uniformly within the irrigation mat so that on the whole, a better fluid distribution over the entire irrigation mat is achieved.

In some embodiments, the drip emitter is equipped with a metallic component, particularly in the vicinity of the exit opening, which prevents the penetration of plant roots into the exit opening of the drip emitter. The metallic component prevents the penetration of plant roots by means of chemical reactions.

In one embodiment, the metallic component is composed of copper or a copper alloy. Not only is copper a nutrient for plants, but it also hinders root growth when a high concentration of copper ions comes into contact with the roots. This keeps the exit opening free of penetrating roots in a simple way.

Tubes with drip emitters equipped in this way are in fact basically known from EP 2 248 414 A1. The advantageous use of such tubes in combination with irrigation mats according to the disclosed embodiments, however, is not yet known. The advantage of this combination of irrigation mats that are needled over a large area and tubes with drip emitters of this kind lies in the fact that it is no longer necessary to take additional steps to prevent a penetration of root systems into the exit openings of the tubes, such as covering the tubes. The required tunnel volumes are smaller than with covered tubes so that the irrigation mat can be wound more tightly and the transport volume of the wound irrigation mat can be kept to a minimum.

In some embodiments, the tube is composed of an elastic material. Tubes composed of a flexible plastic material have the advantage that the irrigation mats provided with these tubes can be wound much more tightly, i.e. with a smaller curvature radius. This significantly reduces the transport volume of the wound irrigation mats.

Such soft tube materials have the further advantage that the irrigation mats equipped with the tubes can be cut to size without having to use different cutting tools for the irrigation mat on the one hand and the tubes on the other.

In order to prevent root systems from penetrating into the exit openings of the tubes, aside from the use of a component made of copper, there are other possible embodiments. According to one embodiment, the tube has a covering composed of a textile fabric, such as one of the fabrics described above. The textile fabric can also be composed of a nonwoven. In order to fix the textile fabric on the tube, it is wound with at least one thread, such as using the looped thread technique, which is also referred to as the Kemafil technique.

The cross-section of the tunnels may be matched to the cross-section of the tube so that the lower layer and upper layer rest over a large area against at least part of the outers surface of the tube.

BRIEF DESCRIPTION OF THE DRAWINGS

Exemplary embodiments will be described in greater detail below in conjunction with the drawings.

The components in the figures are not necessarily to scale, emphasis instead being placed upon illustrating the principles of the invention. In the figures, like reference numerals designate corresponding parts throughout the different views.

DETAILED DESCRIPTION OF EMBODIMENTS

Figure 1:
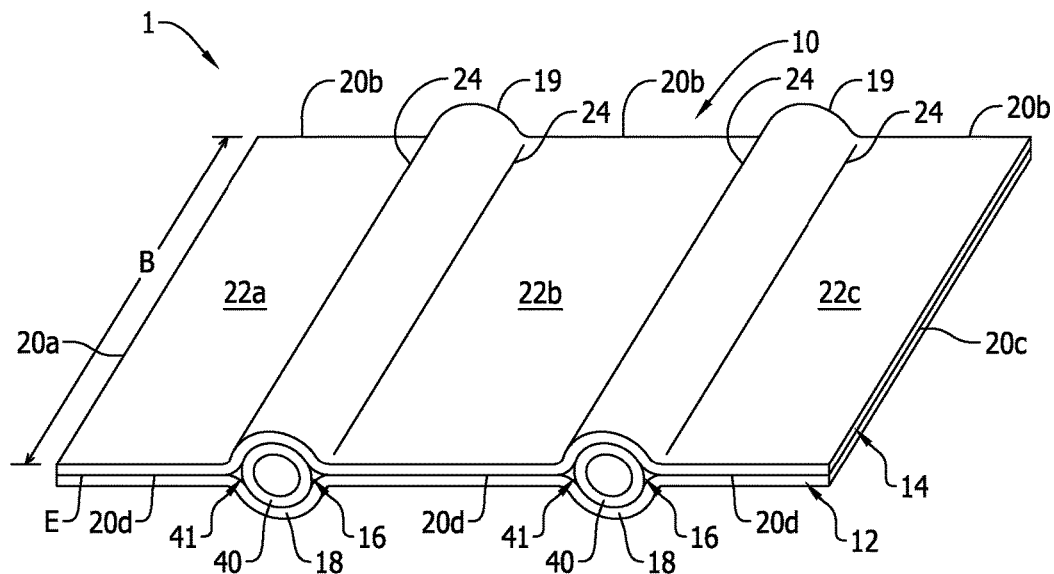
FIG. 1 shows an irrigation system with an irrigation mat equipped with two tubes.

FIG. 1 is a perspective depiction of an irrigation system 1 with an irrigation mat 10 and two tubes 40. The irrigation mat 10 has a lower layer 12 and an upper layer 14 composed of a textile fabric. This textile fabric can be composed of a nonwoven. Each layer has a grammage of, for example, 300 g/m². When this irrigation system 1 is laid into the soil, the irrigation mat 10 is placed so that the upper layer 14 is oriented toward the plants.

The two layers 12, 14 each have two folds 18 and 19 so that between the lower layer 12 and the upper layer 14, two straight tunnels 16 are formed in which the tubes 40 are contained. The tunnels 16 extend over the entire width B of the irrigation mat 10. The folds 18, 19 are essentially the same size so that the irrigation mat 10 is symmetrically embodied relative to the dividing plane E between the layers 12, 14.

If the two layers 12, 14 are identical, i.e. are in particular composed of an identical material, then the irrigation mat can 10 can also be laid so that the positions of the lower layer 12 and the upper layer 14 are reversed.

The cross-section of the tunnels 16 is matched to the cross-section of the tubes 40 so that in the region of the folds 18, 19, the lower layer 12 and the upper layer 14 largely rest over a large area against the outer surface 41 of the tubes 40. The smaller the cross-section of the tunnels 16 is embodied to be, the closer the edge 24 of the folds 18, 19 comes to the tunnels 16 and the greater the area of the irrigation mat that is available for the needling.

The irrigation mat 10 has four edges 20a through 20d. Between the edges 24 of the folds 18, 19 and the respective edges 20a through 20d, three regions 22a,b,c in total are produced in which the lower and upper layer 12, 14 are attached to each other by means of needling or felting. Other attachment methods may also be employed such as welding, adhesives, or the like.

Figure 2:
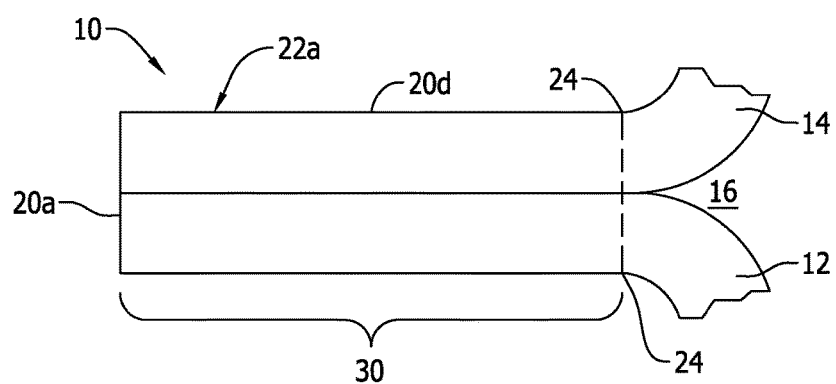
FIG. 2 shows a top view of an end surface section of the irrigation mat shown in FIG. 1.

In the regions 22a,b,c, the lower layer 12 and the upper layer 14 are attached to each other by needling over their entire area, i.e. the entire area of the regions 22a,b,c was used for the needling. This is also shown in FIG. 2, which shows a detail of the end surface of irrigation mat 10 from FIG. 1. The needled end surface section 30 extends from the edge 20a to the edge 24 where the layers 12, 14 extend away from each other to form the tunnel 16. The entire available area is needled in the embodiment shown in FIGS. 1 and 2.

By means of the needling, the fibers of the layers 12, 14 resting against each other are looped or felted with each other so that the dividing line between the layers 12, 14 is largely eliminated. This is indicated by the dashed line in FIG. 2. The irrigation mat 10 may thus form a single matrix as a result of the needling process.

One or both of the layers 12, 14 can be composed of a hydrophilic or hydrophilized material. In one embodiment, the lower layer 12 is composed of such a material. In addition, at least one layer can be composed of polyester, in particular a polyester nonwoven. In one embodiment, at least the lower layer 12 is composed of a polyester material.

Figure 3:
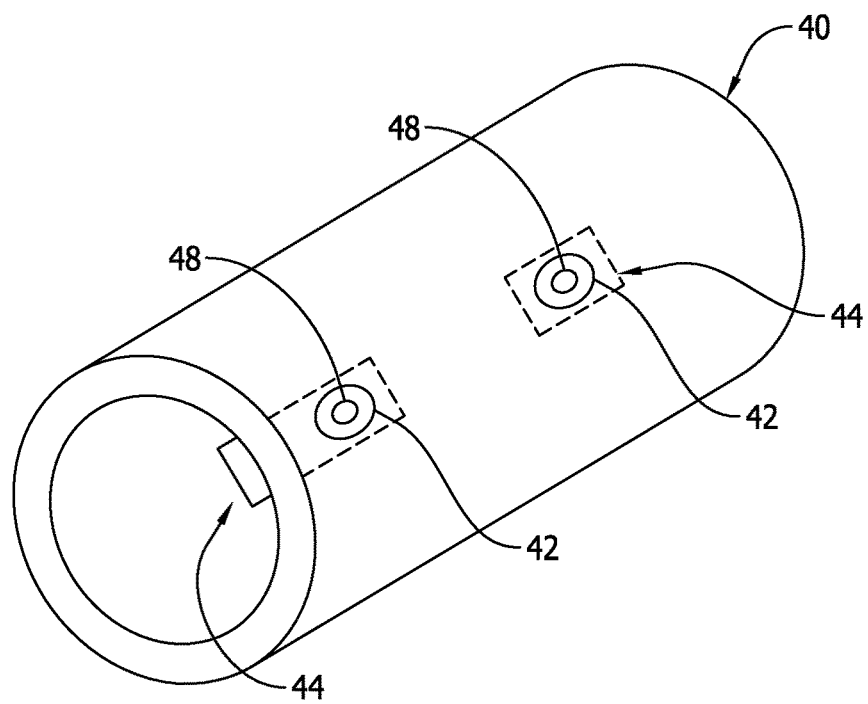
FIG. 3 is a perspective depiction of a tube with drip emitters.

FIG. 3 is a perspective depiction of an embodiment of a tube 40. Inside the tube 40, in the vicinity of the exit openings 42, drip emitters 44 are provided, which have an exit aperture 48. The tube 40 is configured to convey various fluids, such as liquids and/or gasses, to facilitate irrigation.

Figure 4:
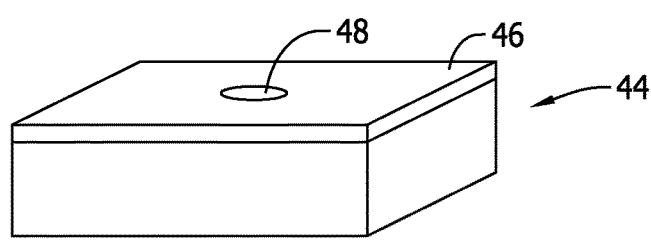
FIG. 4 is a perspective depiction of a drip emitter.

FIG. 4 shows an enlarged, only schematic depiction of such a drip emitter 44. The drip emitter 44 has a metallic component 46 composed of copper or a copper alloy in the form of a cover plate in which the exit opening 48 is provided. The copper part can also be situated inside the drip emitter 44.

Figure 5:
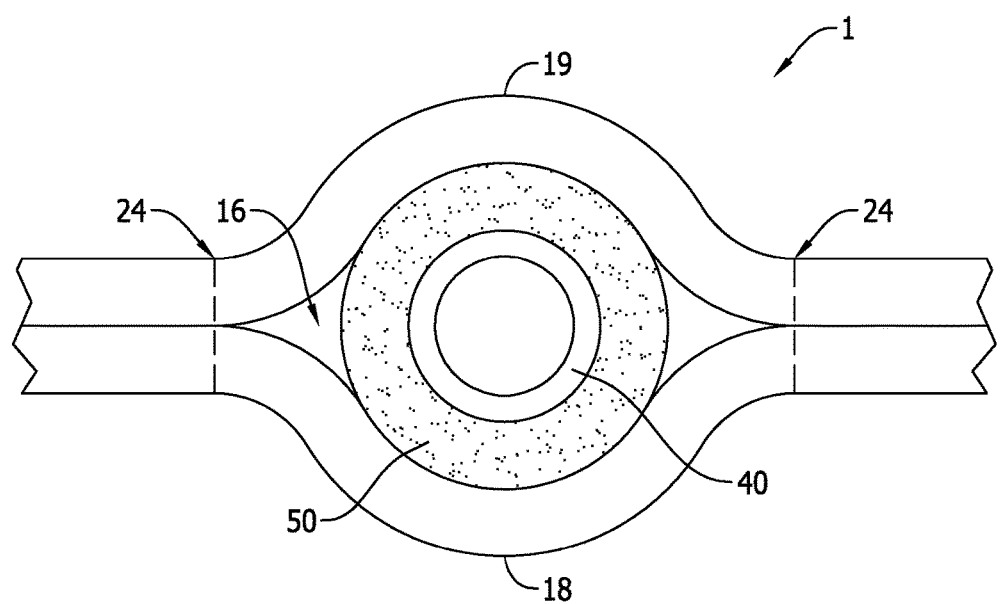
FIG. 5 shows a detail from a view of the end surface of an irrigation mat according to another embodiment.
Figure 6:
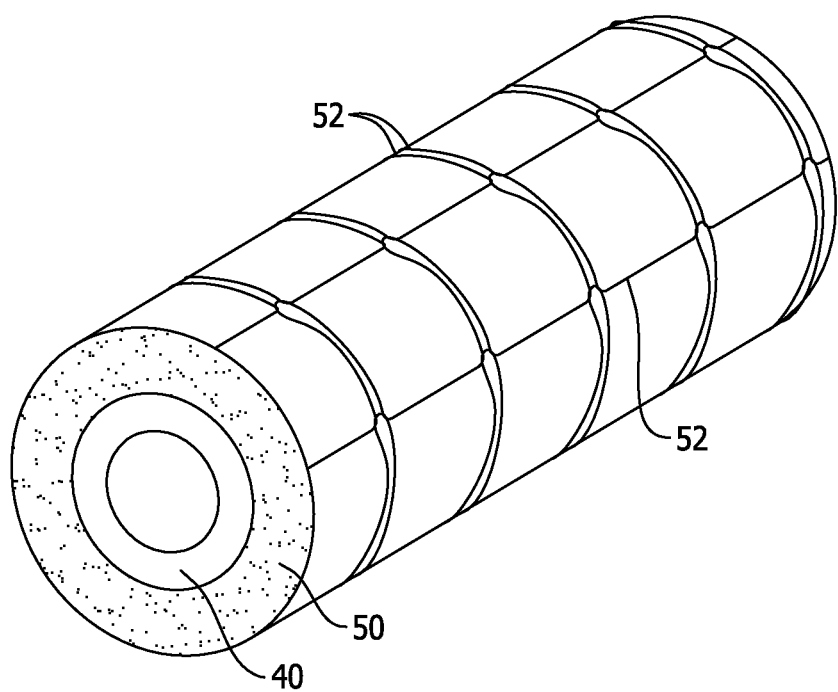
FIG. 6 is a perspective depiction of a covered tube.

FIG. 5 shows another embodiment of an irrigation system 1 in which the tube 40 is provided with a cover 50. The cover may be composed of a nonwoven fabric, which is placed around the tube 40. The cover 50 is fixed to the tube 40 by means of at least one thread 52, which is wound around the cover 50 using the looped thread technique (see FIG. 6).

Figure 7:
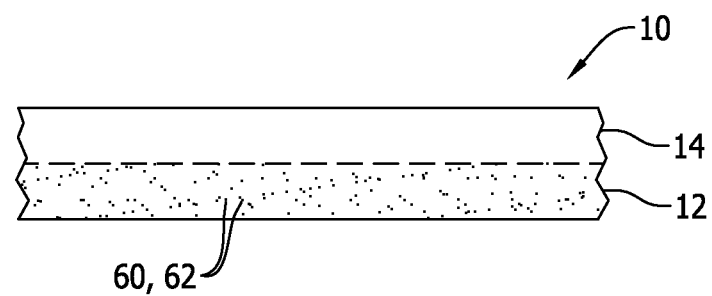
FIG. 7 and FIG. 8 are two schematic depictions of a section through an irrigation mat with powders.
Figure 8:
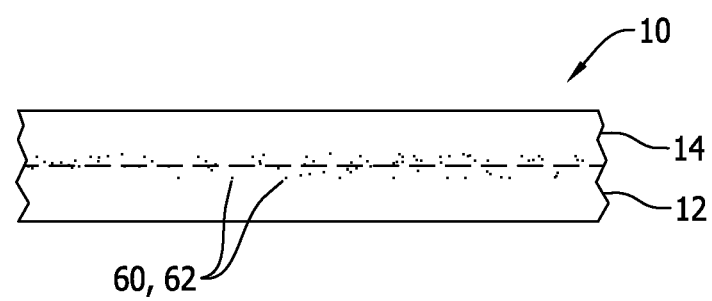

FIGS. 7 and 8 show two details of irrigation mats 10 according to other embodiments. As shown in FIG. 7, an absorbent powder 60 and/or a powder 62 composed of mycorrhizal fungi is incorporated into the lower layer 12. In one exemplary embodiment, the quantity of absorbent powder 60 is preferably 15 g/m². In another exemplary embodiment, the quantity of powder 62 composed of mycorrhizal fungi is preferably 30 g/m².

FIG. 8 shows another embodiment in which the powder 60 and/or 62 has been strewn in during the production of the irrigation mat 10. The powder 60, 62 is preferably strewn onto the lower layer 12 before the upper layer 14 is placed onto it and attached to the lower layer 12 by means of needling. The needling causes the powder 60, 62 to be distributed in a largely uniform fashion in the contact region between the two layers 12, 14.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. An irrigation mat for supplying fluid for a root region of plants, the irrigation mat comprising:
    at least one lower layer and at least one upper layer that are each comprised of a textile fabric,
    a first tunnel and a second tunnel disposed between the at least one lower layer and the at least one upper layer, and
    a first mat region comprising a large, planar region extending from the first tunnel to the second tunnel, and from a first edge of the at least one lower layer and the at least one upper layer to a second edge of the at least one lower layer and the at least one upper layer, the at least one lower layer and the at least one upper layer being attached to each other over the entire large, planar region of the first mat region by needling throughout the first mat region from the first tunnel to the second tunnel and from the first edge to the second edge, wherein the needling causes adjacent fibers of the at least one upper layer and the at least one lower layer to become intertwined to substantially eliminate a dividing line between the at least one upper layer and the at least one lower layer forming a uniform, largely homogeneous textile fabric in the first mat region.

2. The irrigation mat according to claim 1, wherein the first tunnel and the second tunnel are formed by a fold in the at least one lower layer and by a fold in the at least one upper layer, the first tunnel and the second tunnel each accommodating a tube, the tube having exit openings for the fluid.

3. The irrigation mat according to claim 1, wherein the textile fabric is a nonwoven fabric.

4. The irrigation mat according to claim 1, wherein the textile fabric of at least one of the at least one lower layer and the at least one upper layer comprises a polyester material.

5. The irrigation mat according to claim 1, wherein the textile fabric of at least one of the at least one lower layer and the at least one upper layer comprises a hydrophilic or hydrophilized material.

6. The irrigation mat according to claim 1, further comprising an absorbent powder for storing the fluid.

7. The irrigation mat according to claim 6, wherein the needling distributes the powder uniformly between the at least one lower layer and the at least one upper layer.

8. The irrigation mat according to claim 6, wherein the powder is incorporated by the needling into at least one of the at least one lower layer and the at least one upper layer.

9. The irrigation mat according to claim 6, wherein the irrigation mat comprises 5 to 40 g/m² of the absorbent powder.

10. The irrigation mat according to claim 1, further comprising a powder comprised of mycorrhizal fungi.

11. The irrigation mat according to claim 10, wherein the irrigation mat comprises 10 to 50 g/m² of the powder comprised of mycorrhizal fungi.

12. The irrigation mat of claim 1, further comprising second mat regions disposed opposite the first tunnel and the second tunnel from the first mat region and adjacent to the first tunnel and the second tunnel, the second mat regions each comprising a large, planar area, the at least one lower layer and the at least one upper layer being attached to each other over the entire large, planar area of the second mat regions by needling, wherein the needling causes adjacent fibers of the at least one upper layer and the at least one lower layer to become intertwined to substantially eliminate a dividing line between the at least one upper layer and the at least one lower layer forming a uniform, largely homogeneous textile fabric in the second mat regions.

13. An irrigation system comprising:
    an irrigation mat comprising
        at least one lower layer and at least one upper layer that are each comprised of a textile fabric,
        a first tunnel and a second tunnel disposed between the at least one lower layer and the at least one upper layer, and
        a first mat region comprising a large, planar region extending from the first tunnel to the second tunnel, and from a first edge of the at least one lower layer and the at least one upper layer to a second edge of the at least one lower layer and the east one upper layer, the at least one lower layer and the at least one upper layer being attached to each other over the entire large, planar region of the first mat region by needling throughout the first mat region from the first tunnel to the second tunnel and from the first edge to the second edge, wherein the needling causes adjacent fibers of the at least one upper layer and the at least one lower layer to become intertwined to substantially eliminate a dividing line between the at least one upper layer and the at least one lower layer forming a uniform, largely homogeneous textile fabric in the first mat region, and
    tubes disposed in each of the first tunnel and the second tunnel, the tubes having exit openings.

14. The irrigation system according to claim 13, wherein the tubes have a drip emitter adjacent to at least one exit opening of the exit openings.

15. The irrigation system according to claim 13, wherein the tubes are comprised of an elastic material.

16. The irrigation system according to claim 13, wherein the tubes comprise a cover comprised of a textile fabric.

17. The irrigation system according to claim 16, wherein at least one thread is wound around the cover using a looped thread technique.

18. The irrigation system according to claim 13, wherein the first tunnel and the second tunnel formed in the at least one lower layer and the at least one upper layer rest directly adjacent to an outer surface of the tubes around substantially an entire circumference of the tubes.

19. The irrigation system of claim 13, wherein the irrigation mat further comprises second mat regions disposed opposite the first tunnel and the second tunnel from the first mat region and adjacent to the first tunnel and the second tunnel, the second mat regions each comprising a large, planar area, the at least one lower layer and the at least one upper layer being attached to each other over the entire large, planar area of the second mat regions by needling, wherein the needling causes adjacent fibers of the at least one upper layer and the at least one lower layer to become intertwined to substantially eliminate a dividing line between the at least one upper layer and the at least one lower layer forming a uniform, largely homogeneous textile fabric in the second mat regions.

* * * * *